(12) United States Patent
Kassman et al.

(10) Patent No.: US 6,502,852 B2
(45) Date of Patent: Jan. 7, 2003

(54) AIR BAG COVER WITH INTERNAL HINGE CONFIGURATION

(75) Inventors: Mark E. Kassman, Miamisburg, OH (US); Patrick W. Schatz, Lebanon, OH (US); Mark Thomas Winters, Troy, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/892,274

(22) Filed: Jun. 26, 2001

(65) Prior Publication Data

US 2002/0060446 A1 May 23, 2002

Related U.S. Application Data

(60) Provisional application No. 60/249,948, filed on Nov. 20, 2000.

(51) Int. Cl.⁷ .................. B60R 21/20; B60R 21/16; B60R 21/22
(52) U.S. Cl. .................... 280/728.3; 280/731
(58) Field of Search ................ 280/728.3, 731, 280/728.1, 732

(56) References Cited

U.S. PATENT DOCUMENTS

| | | | |
|---|---|---|---|
| 4,148,503 A | 4/1979 | Shiratori et al. | 280/731 |
| 4,903,986 A | 2/1990 | Cok et al. | 280/743 |
| 5,060,971 A | 10/1991 | Nanbu et al. | 280/728 |
| 5,248,532 A | 9/1993 | Sawada et al. | 428/35.2 |
| 5,292,150 A | 3/1994 | Watanabe et al. | 280/728 |
| 5,320,380 A | 6/1994 | Hamada et al. | 280/728 |
| 5,335,935 A | 8/1994 | Proos et al. | 280/728 |
| 5,423,571 A * | 6/1995 | Hawthorn | 280/738 |
| 5,730,460 A | 3/1998 | Niederman | 280/731 |
| 5,803,487 A * | 9/1998 | Kikuchi et al. | 280/728.2 |
| 5,913,534 A | 6/1999 | Klingauf | 280/728.3 |
| 6,050,594 A | 4/2000 | Budnick | 280/728.3 |
| 6,095,552 A * | 8/2000 | Hosoi et al. | 280/731 |
| 6,199,897 B1 | 3/2001 | Kreile | 280/728.3 |
| 6,247,722 B1 | 6/2001 | Brodi, Jr. et al. | 280/728.3 |

* cited by examiner

Primary Examiner—Eric Culbreth
(74) Attorney, Agent, or Firm—Kathryn A. Marra

(57) ABSTRACT

A frangible cover for a vehicle air bag assembly having a displaceable flap portion of controlled flexibility for rotation in hinging fashion generally away from a tear seam at the interior of the cover and towards the perimeter of the cover to form an opening across the cover for egress of an underlying air bag cushion. One or more stiffness reducing members are arranged at the flap portion to control the internal stiffness of the flap portion and to facilitate ease of outward rotational displacement of the flap portion. Such stiffness reducing members may be arranged in a pattern extending in the region between the outer edge of the cover and a portion of an interior tear seam.

37 Claims, 9 Drawing Sheets

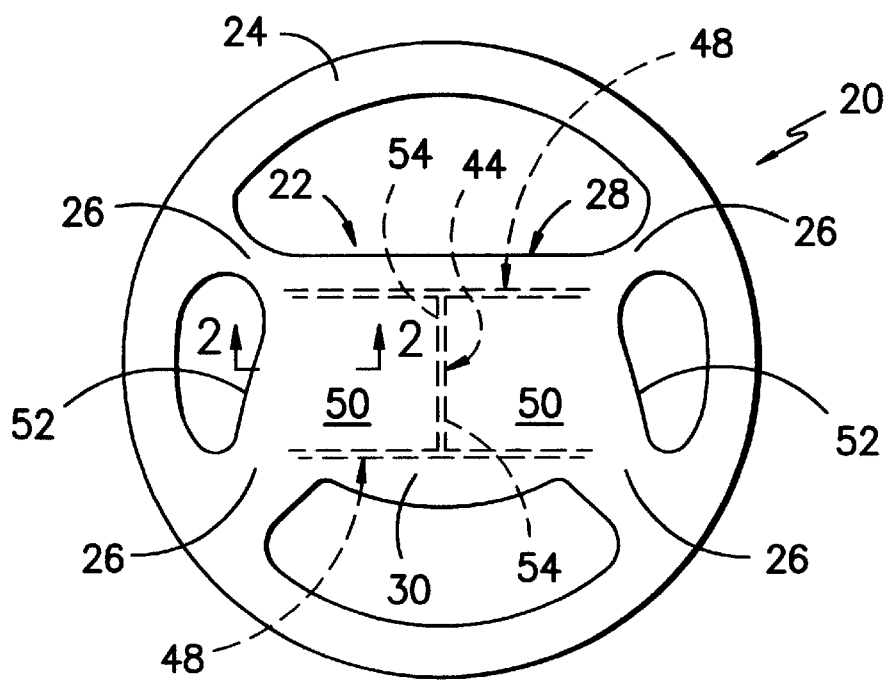
FIG. -1-
PRIOR ART
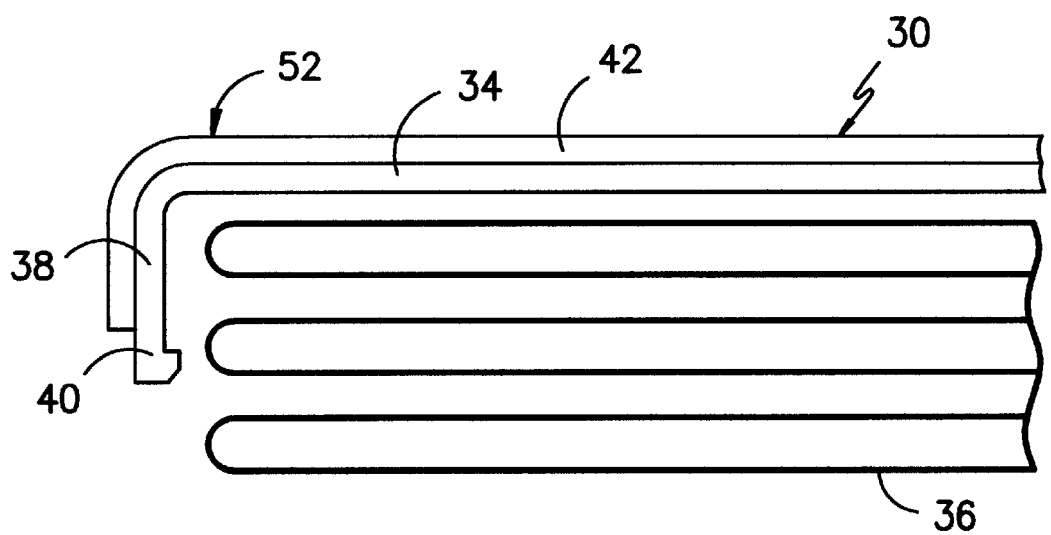
FIG. -2-
PRIOR ART

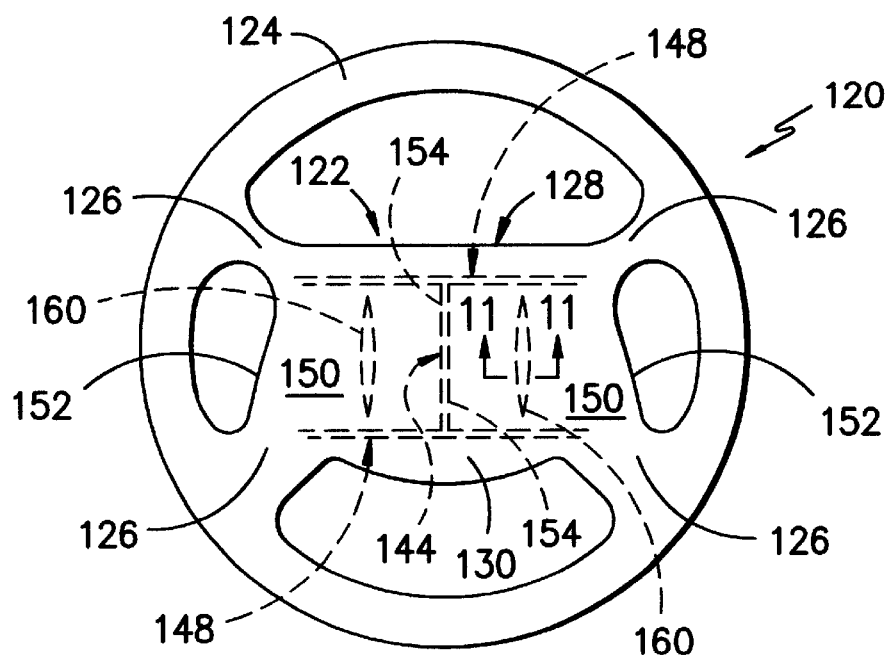
FIG. -3-
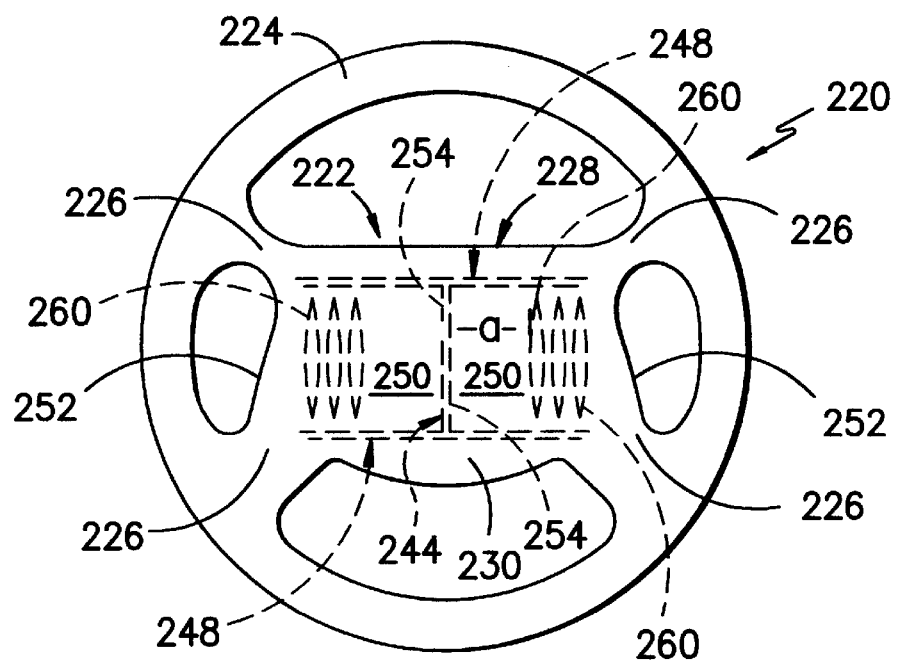
FIG. -4-

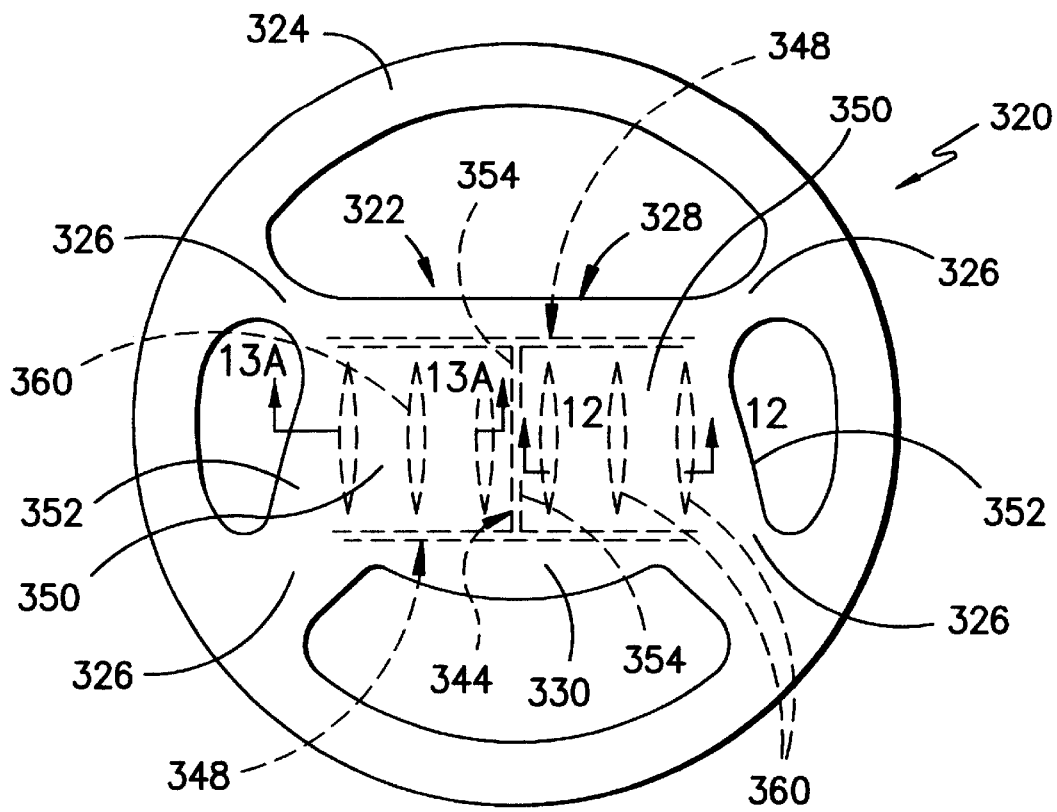
FIG. -5-
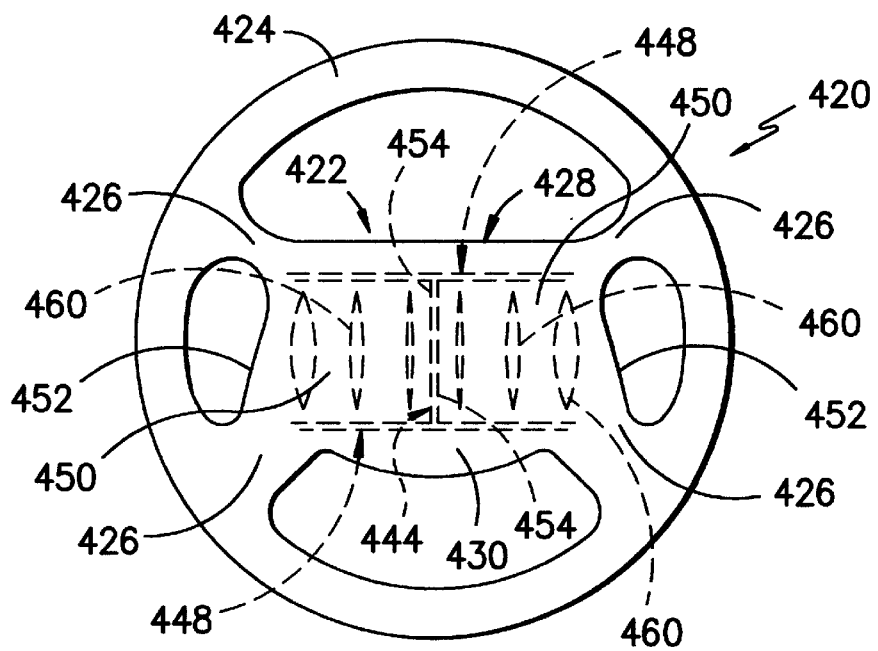
FIG. -6-

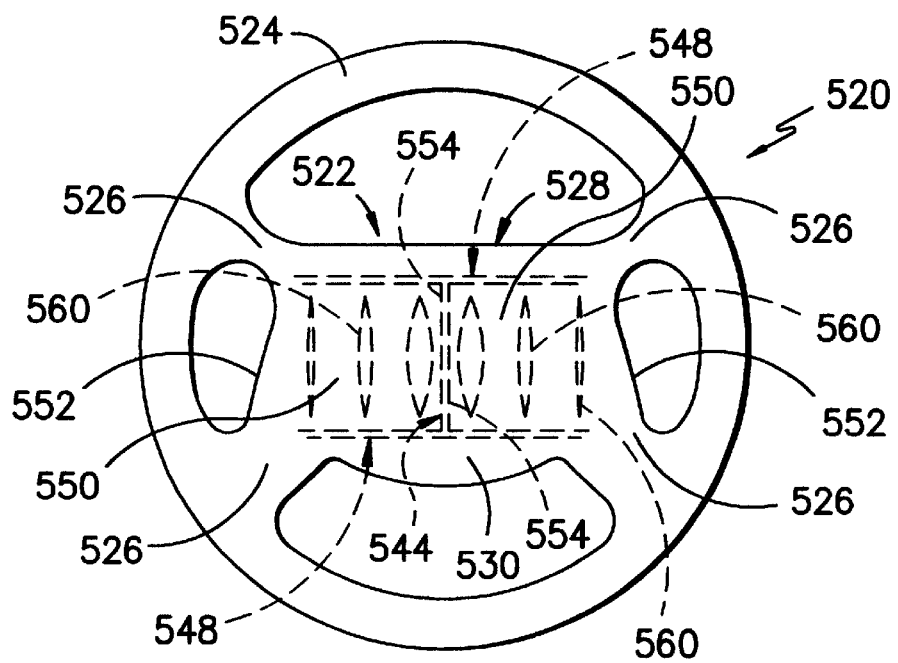
FIG. -7-
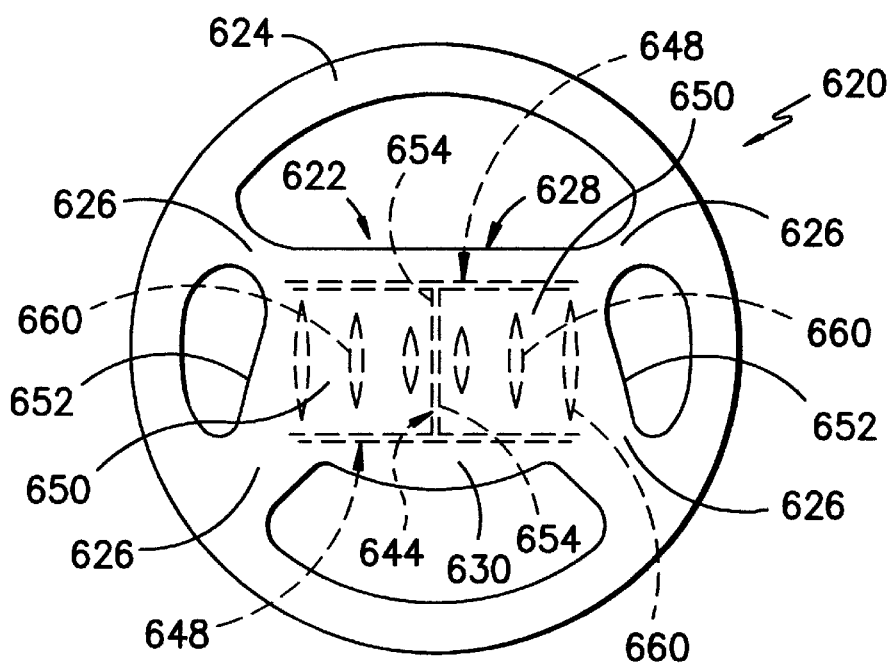
FIG. -8-

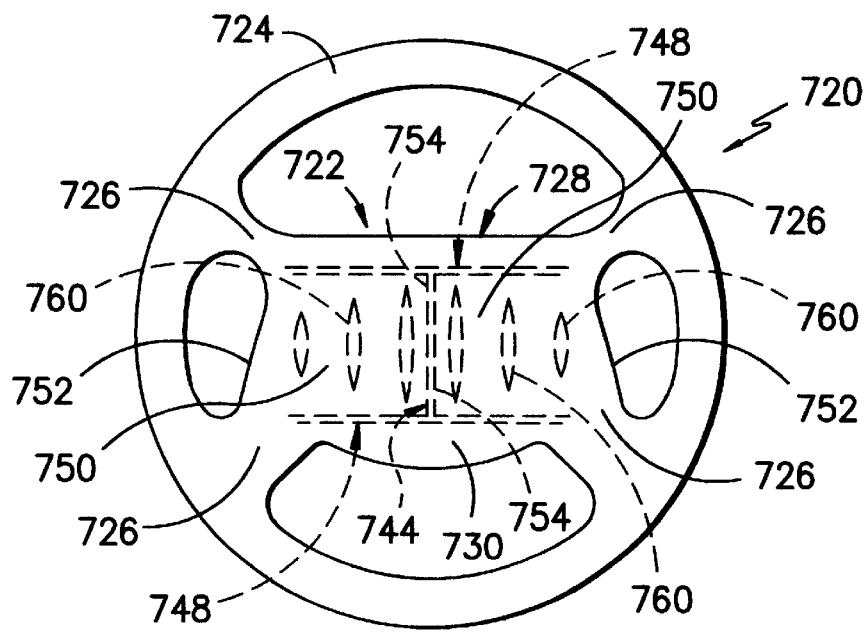
FIG. -9-
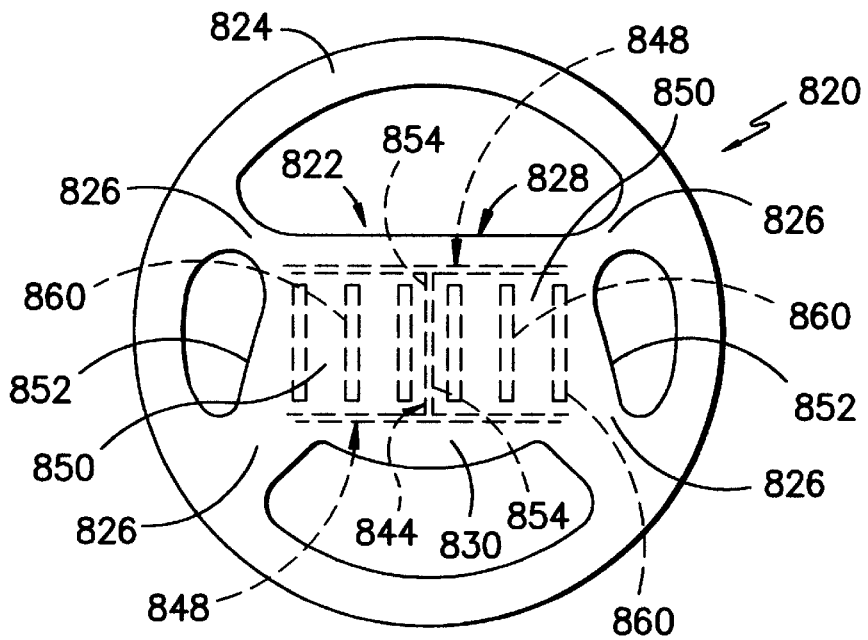
FIG. -10-

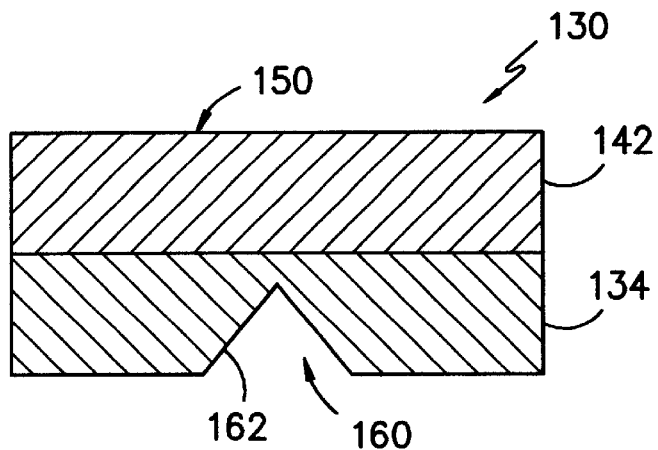
FIG. -11-
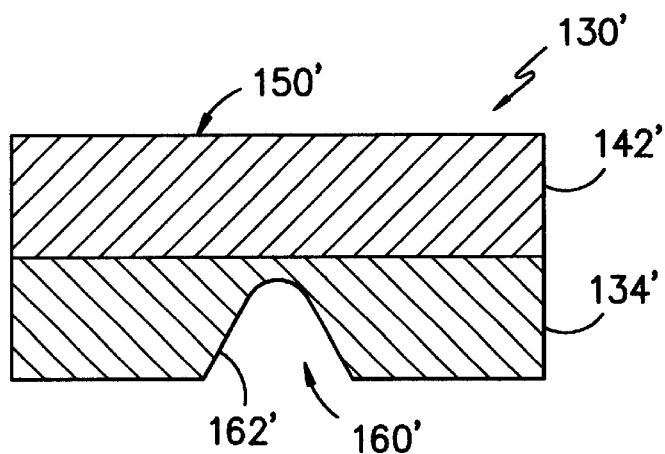
FIG. -11A-
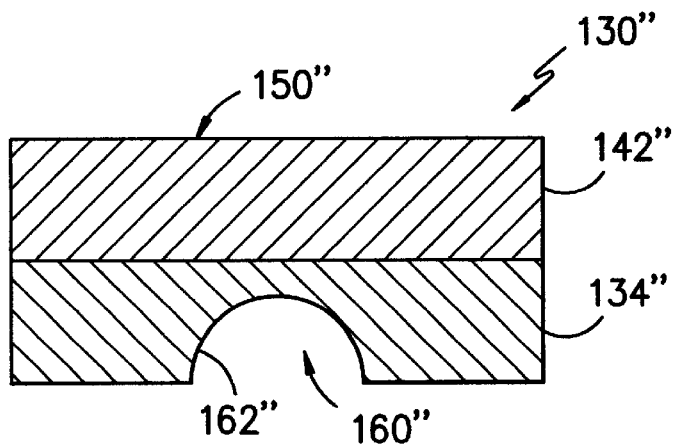
FIG. -11B-

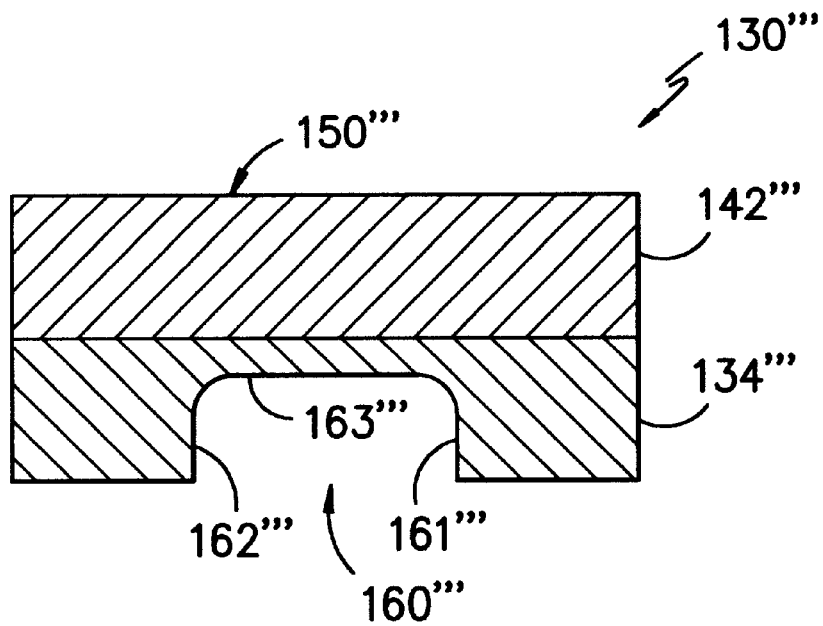
FIG. -11C-
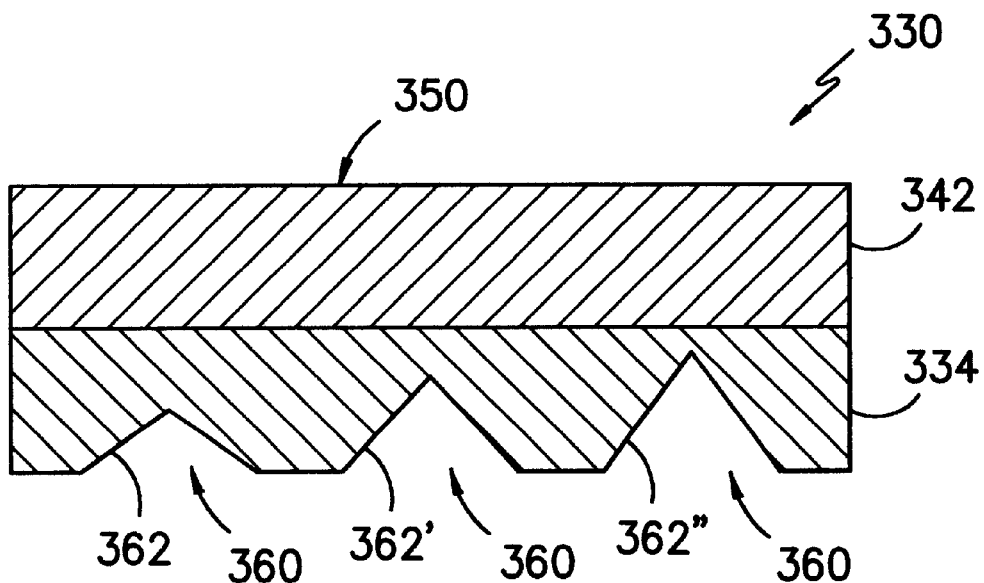
FIG. -12-

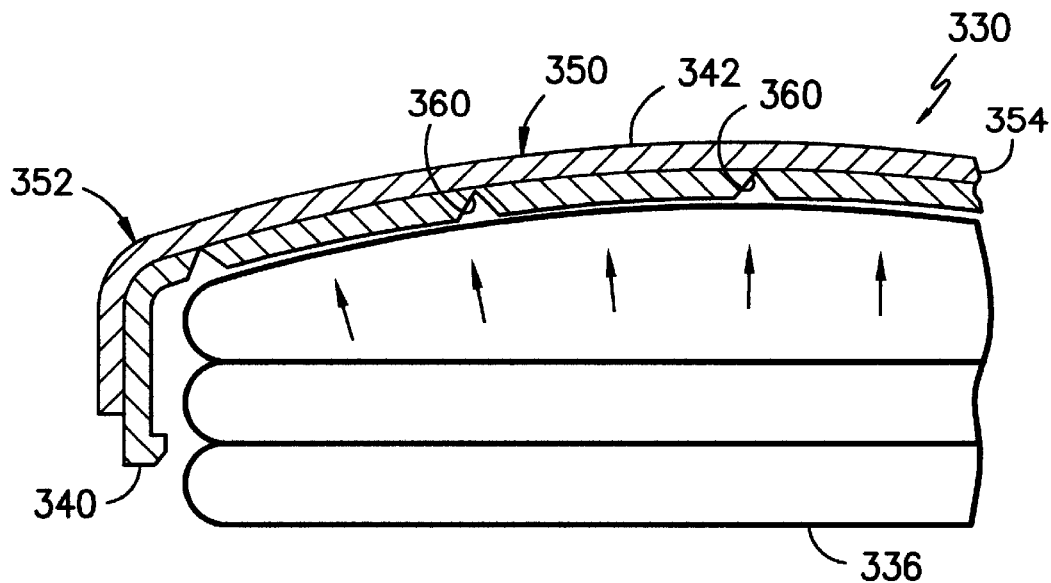
FIG. -13A-
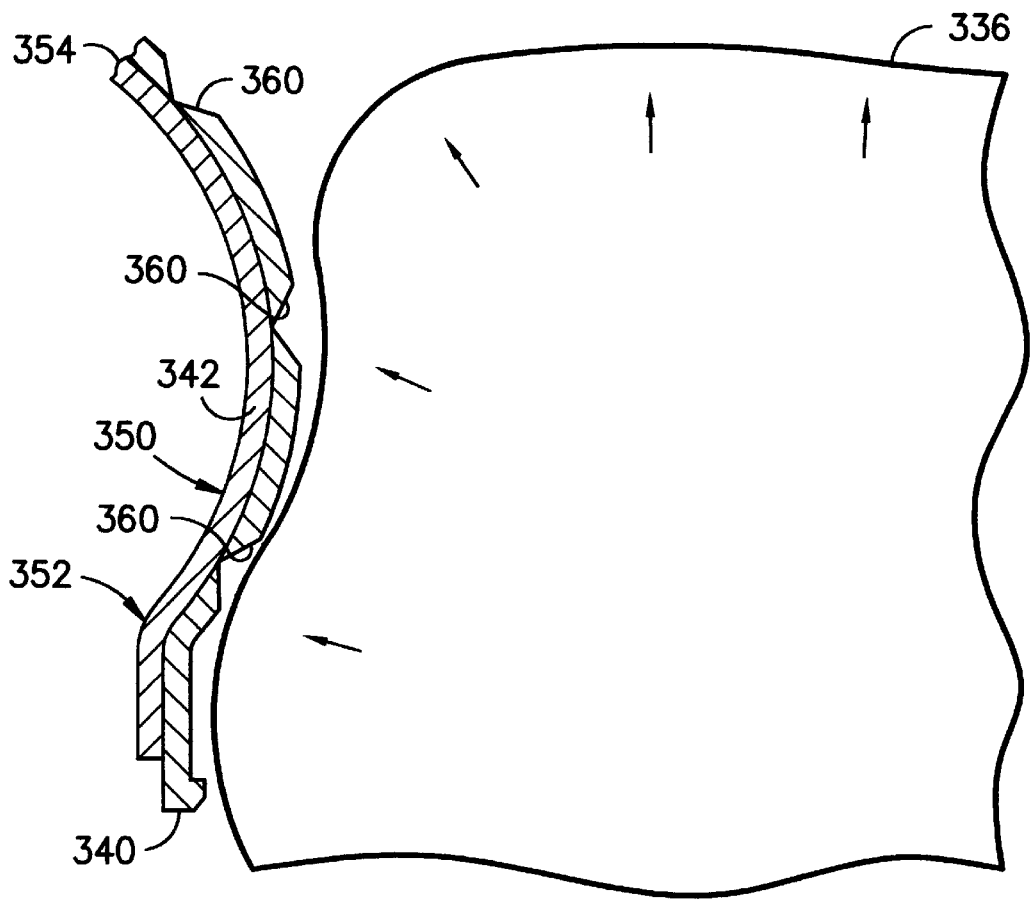
FIG. -13B-

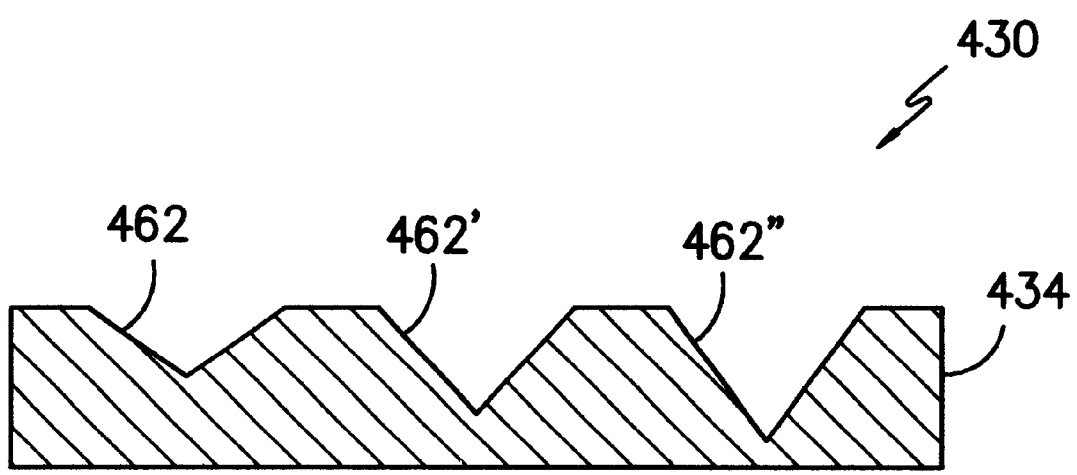
FIG. -14-

AIR BAG COVER WITH INTERNAL HINGE CONFIGURATION

CROSS-REFERENCE TO RELATED APPLICATION

This application claims priority from Provisional Application 60/249,948 for AIR BAG COVER WITH INTERNAL HINGE CONFIGURATION filed Nov. 20, 2000 the contents of which are incorporated by reference as if fully set forth herein.

TECHNICAL FIELD

The present invention relates to a cover for a vehicle air bag, and more particularly to a cover which includes a displaceable flap portion of controlled flexibility incorporating one or more stiffness reducing elements which flap portion opens in substantially hinging fashion away from an internally disposed tear seam.

BACKGROUND OF THE INVENTION

It is well known in motor vehicles to provide an air bag module for protecting a vehicle occupant. It is also generally known to provide an air bag module including an inflatable restraint cushion and an inflator for discharging gas to inflate the cushion upon sensing predetermined vehicle conditions. It is also known to provide air bag modules for the protection of a vehicle operator including cover elements overlying an inflatable restraint cushion in a stored position within the module. Such cover elements typically include tear seams at the interior which separate upon application of pressure by the inflatable restraint cushion during inflation such that the surface of the cover element folds outwardly in flap-like fashion generally away from the interior of the cover and towards the periphery thereof.

SUMMARY OF THE INVENTION

This invention provides advantages and alternatives over the prior art by providing a frangible cover for a vehicle air bag assembly which cover includes a displaceable flap portion of controlled flexibility for rotation in hinging fashion generally away from a tear seam at the interior of the cover and towards the perimeter of the cover to form an opening across the cover for egress of an underlying air bag cushion through the cover. One or more stiffness reducing members are arranged at the flap portion to control the internal stiffness of the flap portion and to facilitate ease of outward rotational displacement of the flap portion. Such stiffness reducing members may be arranged in a pattern extending in the region between the outer edge of the cover and a portion of an interior tear seam.

These advantages are accomplished in a potentially preferred form of the invention by providing a frangible cover of controlled stiffness for use in overlying relation to an inflatable air bag cushion. The cover includes a tear seam extending in a predefined pattern such as an "H" shaped pattern, "U" shaped pattern or "I" shaped pattern across the interior of the cover such that upon inflation of the air bag cushion the cover opens along the tear seam. A displaceable flap portion located in a region between the tear seam and the perimeter of the cover is folded back in a hinging manner in a direction generally away from the tear seam and towards the perimeter upon egress of the underlying air bag cushion. At least one stiffness reducing depression is disposed in predefined orientation across at least a portion of the displaceable flap portion between the tear seam and the perimeter of the cover to control the internal stiffness of the flap portion and to facilitate outward hinging rotation.

According to one aspect of the invention, the stiffness reducing depression is preferably of a generally elongate configuration having a length dimension greater than its width dimension. Such a depression of elongate configuration preferably extends in lengthwise fashion generally transverse to the direction of hinging movement of the flap portion so as to facilitate hinging rotation.

According to another aspect of the present invention, a number of stiffness reducing depressions of generally elongate configuration may extend in an arrangement across the flap portion between the tear seam and the perimeter of the cover generally transverse to the direction of hinging movement of the flap portion. The arrangement of the stiffness reducing depressions may be such that the stiffness of the flap portion either increases or decreases with increased distance away from the tear seam and towards the perimeter.

BRIEF DESCRIPTION OF THE DRAWINGS

The present invention will now be described, by way of example only with reference to the accompanying drawings in which:

FIG. 1 is an elevation plan view of a prior art steering wheel and an air bag cover;

FIG. 2 is a cross-sectional view taken generally along line 2—2 in FIG. 1 illustrating an air bag cover according to the prior art;

FIG. 3 is a view similar to FIG. 1 illustrating an embodiment of an air bag cover according to the present invention;

FIG. 4 is a view similar to FIG. 3 illustrating an embodiment of an air bag cover according to the present invention;

FIG. 5 is a view similar to FIG. 3 illustrating an embodiment of an air bag cover according to the present invention;

FIG. 6 is a view similar to FIG. 3 illustrating an embodiment of an air bag cover according to the present invention;

FIG. 7 is a view similar to FIG. 3 illustrating an embodiment of an air bag cover according to the present invention;

FIG. 8 is a view similar to FIG. 3 illustrating an embodiment of an air bag cover according to the present invention;

FIG. 9 is a view similar to FIG. 3 illustrating an embodiment of an air bag cover according to the present invention;

FIG. 10 is a view similar to FIG. 3 illustrating an embodiment of an air bag cover according to the present invention;

FIGS. 11—11C are views taken generally along line 11—11 in FIG. 3 illustrating various cross-sectional geometries for a stiffness reducing depression in an air bag cover according to the present invention;

FIG. 12 is a view taken generally along line 12—12 in FIG. 5 illustrating a cross-sectional arrangement of depressions in an air bag cover;

FIG. 13A is a cross sectional view of a portion of an air bag cover according to the present invention taken generally along line 13—13 in FIG. 5 during an early stage of cushion deployment; and FIG. 13B is a cross sectional view similar to FIG. 13A of a portion of an air bag cover according to the present invention during the latter stages of cushion deployment.

FIG. 14 illustrates an exemplary arrangement of depressions across the upper surface of an air bag cover.

While the invention has been illustrated and generally described above and will hereinafter be described in connection with certain potentially preferred embodiments and practices, it is to be understood that in no event is the invention to be limited to such illustrated and described embodiments and practices. On the contrary, it is intended that the present invention shall extend to all alternatives and modifications as may embrace the broad principles of this invention within the true spirit and scope thereof. In particular, while the air bag cover of the present invention is illustrated and described in relation to a driver side configuration at the interior of a steering wheel so as to facilitate understanding, it is contemplated that the invention is likewise applicable in other environments of use including by way of example only, application in covering relation to inflatable air bag cushions within the instrument panel, door panels and seats. Accordingly, the term "cover" as used herein is intended to encompass any covering element as may be used in overlying relation to an inflatable air bag cushion including, by way of example only and not limitation, relatively thin molded covers extending over air bag cushions at the interior of a steering wheel as well as displaceable door-like structures disposed over air bag cushions within the instrument panel on the passenger side of a vehicle.

DISCRIPTION OF THE PREFERRED EMBODIMENTS

Referring FIG. 1, a typical vehicle steering wheel 20 includes a central hub portion 22, a generally circular outer rim portion 24 and a plurality of spokes 26 extending between the hub portion 22 and the rim portion 24. An air bag module 28 is mounted on the hub portion 22 of the steering wheel 20. The air bag module 28 includes an inflatable air bag cushion 36 (FIG. 2) in fluid communication with an inflator (not shown) for discharging gas to inflate the air bag cushion 36. An air bag cover 30 typically overlies the air bag cushion and inflator thereby serving as a barrier between the operative elements of the air bag module 28 and the interior of the vehicle.

As illustrated in FIG. 2, the air bag cover 30 may be of a two-layered construction including an inner cover substrate forming an inner layer 34. This inner layer 34 is typically formed of a relatively rigid thermoplastic material suitable for formation by injection molding practices. In order to promote coverage over the underlying air bag cushion 36 and inflator, the air bag cover 30 may be of a generally cup shaped geometry including a generally downwardly extending wall portion 38 disposed substantially along the perimeter of the air bag cover 30. The downwardly extending wall portion 38 may include hooks 40 for cooperating attachment to an underlying support structure in a manner well known to those of skill in the art.

According to the illustrated embodiment, the air bag cover 30 may include a decorative outer layer 42 of a material such as a soft urethane foam or a thermoplastic rubber which adheres to the material forming the inner layer 34. As will be appreciated, the outer layer 42 serves a primarily decorative function and may be eliminated if desired. Likewise, the air bag cover 30 need not be of the illustrated cup-shaped geometry but may take on any number of other configurations including substantially flat panel door designs and the like as may be desired for a given environment of use.

As seen in FIG. 1, the air bag cover 30 typically includes an arrangement of tear seams of reduced thickness disposed in a pattern across the interior of the air bag cover 30. According to the illustrated embodiment, the air bag cover includes a substantially central tear seam 44 and intersecting lateral tear seams 48. The tear seams 44, 48 are generally formed within the air bag cover 30 by grooves or a plurality of spaced apart depressions molded or cut in the desired pattern at least partially across the inner layer 34 towards the outer layer 42. According to the illustrated arrangement, the central tear seam 44 and lateral tear seams 48 are arranged in a substantially "I" shaped pattern with the central tear seam 44 being disposed across the air bag cover 30 in a substantially vertical orientation and with the lateral tear seams 48 being disposed along the top and bottom perimeter edges of the air bag cover 30. Another known tear seam arrangement is the so called "H" shaped pattern wherein a central tear seam is disposed across the interior of the air bag cover 30 in a substantially horizontal configuration with lateral tear seams extending vertically adjacent left and right perimeter edges. So called "U" shaped, horizontal "U" shaped and inverted "U" shaped arrangements are also known wherein the legs of the "U" intersect a central crossing seam to define the boundaries of an opening across the air bag cover. Other tear patterns such as a diagonal tear line and a generally "Y" shaped arrangement are also known.

Regardless of the particular tear seam arrangement utilized, as the air bag cover 30 is torn open, one or more flap portions 50 are caused to move in substantially hinging fashion generally away from the interior of the air bag cover and towards a fixed side 52 adjacent the perimeter of the air bag cover 30 as the underlying air bag cushion emerges through the air bag cover 30. Such hinging movement causes a releasable edge 54 opposing the fixed side 52 to be displaced from a location of attachment along the tear seam as it is forced outwardly.

The present invention provides additional control over this outward hinging movement for virtually any tear seam arrangement and virtually any cover construction. Thus, it is to be understood that while the invention is hereinafter illustrated and described in relation to an "I" shaped tear pattern, the invention is equally applicable to use with an "H" shaped tear pattern, a "U" shaped tear pattern, an inverted "U" shaped tear pattern, a horizontal "U" shaped tear pattern, a singular substantially horizontal tear seam, a singular substantially vertical tear seam, a singular substantially diagonal tear seam, a "Y" shaped tear pattern and other suitable tear patterns. Likewise, while the invention is hereinafter illustrated and described in relation to cover constructions incorporating two layers, it is equally applicable to cover constructions having a single layer as well as to cover constructions of three or more layers if desired.

Referring to FIG. 3, a first embodiment of the present invention is illustrated wherein like elements to those illustrated and described in relation to FIG. 1 are designated by like reference numerals increased by 100. As shown, in the illustrated embodiment the air bag cover 130 includes integral stiffness reducing members 160 disposed across the displaceable flap portions 150 at an interior position adjacent to and inboard of the attached sides 152. These stiffness reducing members are preferably of an elongate configuration arranged generally transverse to the direction of hinging movement by the flap portions 150 during deployment of the underlying air bag cushion so as to ease the bending of the flap portions 150.

It is contemplated that the stiffness reducing members 160 are preferably in the form of a depression molded or cut across a portion of the inner surface of the cover member 130 during assembly. However, it is also contemplated that the stiffness reducing members may be in the form of depressions extending across the outer surface of the cover member 130 if desired. In addition, it is contemplated that stiffness reducing members other than depressions such as zones of material with varying degrees of flexibility across the air bag cover 130 may also be utilized if desired.

According to a potentially preferred practice, the stiffness reducing members 160 in the form of depressions may be characterized by a width dimension in the range of about 0.5 to about 10 mm with a depth of about 0.2 mm or greater. It is contemplated that the length of the depressions may extend to the full extent permitted by the configuration of the tear seam pattern utilized but may also occupy a much smaller length. By way of example only and not limitation, when using the illustrated "I" or a horizontal "U" tear seam pattern, the length of the depressions forming the stiffness reducing members 160 may range from a top perimeter wall to a bottom perimeter wall of the air bag cover 130 if the lateral tear seams 148 will permit without giving rise to intersection between the stiffness reducing elements 160 and the lateral tear seams 148. In the event that an "H" or "U" tear seam pattern is utilized, the length of the stiffness reducing members 160 may extend substantially from a left side cover wall to a right side cover wall or some fraction of that distance. According to one contemplated arrangement, the length of the stiffness reducing members 160 is such that the ends of the hinge elements are disposed at a distance of about 1 mm to about 30 mm away from the adjacent tear seam edge.

It is contemplated that the stiffness reducing members 160 may take on a relatively wide variety of configurations. By way of example only and not limitation, according to one contemplated embodiment, in the event that the stiffness reducing members are in the form of integral depressions it is contemplated that the cross-sectional geometry of such depressions may be in the form of a substantially straight sided groove 162 having a substantially pointed terminus as illustrated in FIG. 11. According to another exemplary alternative illustrated in FIG. 11A (wherein like elements to those in FIG. 11 are denoted by like reference numerals with a prime), the stiffness reducing member 160' may be in the form of a groove 162' having a substantially rounded terminus. According to still a another exemplary alternative illustrated in FIG. 11B (wherein like elements to those in FIG. 11 are denoted by like reference numerals with a double prime), the stiffness reducing member 160" may be in the form of a groove 162" of substantially semicircular or parabolic cross-section. According to still a further exemplary alternative illustrated in FIG. 11C (wherein like elements to those in FIG. 11 are denoted by like reference numerals with a triple prime), the stiffness reducing member 160''' may be in the form of a groove 162''' of substantially inverted "U" shaped cross-section having substantially straight legs 161''' intersecting a substantially flat base portion 163''' with a curved transition between the legs 161''' and base portion 163'''. Of course a substantially right angled transition may also be utilized if desired. It is contemplated that the depth of the stiffness reducing members 160, 160', 160", 160''' of depressed profile may vary greatly depending upon the thickness of the air bag cover but will preferably be in the range of about 0.2 mm or greater.

Referring to FIG. 4, an alternative arrangement is illustrated wherein reference numerals are increased by 200 and wherein multiple stiffness reducing members 260 are arranged adjacent the attached sides 252 of the flap portions 250. In such an arrangement it is contemplated that each of the stiffness reducing members 260 are arranged within the flap portion 250 in substantially close proximity to one another adjacent the attached side 252 of the flap portion 250 so as to leave a substantially uninterrupted zone between the innermost stiffness reducing member and the releasable edge 254 along the central tear seam 244. Such an arrangement is believed to potentially enhance the ability of the flap portions 250 to hinge away from the interior of the air bag cover 230 and towards the perimeter without substantially altering the stiffness of the flap portions 250 adjacent the location of seam separation. By way of example only, in such an arrangement it is contemplated that the distance "a" between the innermost stiffness reducing member 260 and releasable edge 254 of the flap portions 250 is preferably not less than about 10 mm and will more preferably be about 20 mm or greater and will most preferably be about 35 mm or greater. In such an arrangement it is contemplated that the stiffness reducing members 260 may each be of a substantially uniform construction or may be of varying constructions as discussed further hereinafter to obtain desired hinging characteristics.

Referring to FIG. 5, an alternative embodiment is illustrated wherein reference numerals are increased by 300 and wherein multiple stiffness reducing members 360 are arranged in a substantially regular pattern across the flap portions 350. In the illustrated embodiment incorporating an "I" shaped tear pattern, it is contemplated that the stiffness reducing members 360 may extend in a pattern from a perimeter position adjacent the attached edges 352 of the flap portions 350 to a position at the interior of the cover member adjacent the releasable edge 354 along the central tear seam 344. In like manner, in the event that an "H" or "U" tear seam pattern is utilized, an arrangement of stiffness reducing members may extend from a perimeter position adjacent upper and/or lower edges to a position at the interior of the cover member adjacent the interior portion of the tear seam.

Referring to FIG. 6, an alternative embodiment is illustrated wherein reference numerals corresponding to previously described elements are designated by like reference numerals increased by 400 and wherein multiple stiffness reducing members 460 are arranged in a pattern across the flap portions 450. As illustrated, in this embodiment the stiffness reducing members are of variable width arranged from thinnest at the interior of the air bag cover adjacent the releasable edge 454 along the central tear seam 444 to widest adjacent the attached edge 452 of the flap portions 450. Such an arrangement may promote relatively high stiffness at an internal position while providing enhanced flexibility at an outboard position.

Referring to FIG. 7, another alternative embodiment is illustrated wherein reference numerals corresponding to previously described elements are designated by like reference numerals increased by 500 and wherein multiple stiffness reducing members 560 are arranged in a pattern across the flap portions 550. As illustrated, in this embodiment the stiffness reducing members are of variable width arranged from thickest at the interior of the air bag cover 530 adjacent the releasable edge 554 along the central tear seam 544 to thinnest adjacent the attached edge 552 of the flap portions 550. Such an arrangement may promote ease of bending at an interior location while providing greater stiffness at an outboard position.

Referring to FIG. 8, another embodiment is illustrated wherein reference numerals corresponding to previously described elements are designated by like reference numerals increased by 600 and wherein multiple stiffness reducing members 660 are arranged in a pattern across the flap portions 650. As illustrated, in this embodiment the stiffness reducing members 660 are of variable height arranged from shortest at the interior of the air bag cover 630 adjacent the releasable edge 654 at the central tear seam 644 to longest adjacent the attached side 652 of the flap portions 650. Such an arrangement may promote variable stiffness across the flap portion with greater stiffness at an interior location.

Referring to FIG. 9, another embodiment is illustrated wherein reference numerals corresponding to previously described elements are designated by like reference numerals increased by 700 and wherein multiple stiffness reducing members 760 are arranged in a pattern across the flap portions 750. As illustrated, in this embodiment the stiffness reducing members 760 are of variable height arranged from tallest at the interior of the air bag cover 730 adjacent the releasable edge 754 along the central tear seam 744 to shortest adjacent the attached edge 752 of the flap portions 750. Such an arrangement may promote variable stiffness across the flap portion with lower stiffness at an inboard location.

It is contemplated that the stiffness reducing members in any of the described embodiments may be of a wide array of surface shapes. By way of example only, one shape which may be desirable is a generally cigar shaped elongate configuration with tapered ends and a wider center cross section as illustrated in FIGS. 2–9. In the event that such a configuration is utilized, it is contemplated that the shape of the stiffness reducing member at the end can range from a radius of about 0.1 to about 10 mm. Referring to FIG. 10, another embodiment is illustrated wherein reference numerals corresponding to previously described elements are designated by like reference numerals increased by 800 and wherein multiple stiffness reducing members 860 are arranged in a pattern across the flap portions 850. As shown, in this embodiment, the stiffness reducing members 860 are of a generally straight sided rectangular configuration arranged in side by side orientation. It is contemplated that such stiffness reducing members 860 may be of substantially uniform spacing or may be arranged preferentially adjacent the attached end of the flap portions 850 in the manner as previously illustrated and described in relation to FIG. 4. It is also contemplated that the width of the stiffness reducing members 860 may be uniform as shown or may vary across the flap portions 850 as previously described in relation to FIGS. 6 and 7. It is further contemplated that the height of the stiffness reducing members 860 may be uniform as shown or may vary across the flap portions 850 in a manner as previously described in relation to FIGS. 8 and 9.

In any of the previously described embodiments it is contemplated that the spacing between the stiffness reducing members may vary greatly in different embodiments depending upon desired pivot characteristics. By way of example only, according to potentially preferred practices it is contemplated that the distance between adjacent stiffness reducing members is preferably in the range of about 1 mm to about 16 mm. This spacing may be either regular or irregular across the flap portion.

In embodiments such as those illustrated and described in FIGS. 4–10 which incorporate multiple stiffness reducing members of depressed profile, it is contemplated that the depth of the depressions may vary from member to member. By way of illustration only, in FIG. 12 there is shown a cross-section taken generally along line 12—12 in FIG. 5 illustrating a series of stiffness reducing members 360 formed by grooves 362, 362', 362" of variable depth. In the embodiment as illustrated, the grooves range in depth from deepest adjacent the fixed hinging edge 352 of the flap portions 350 to most shallow at the innermost interior position. Of course, this arrangement may also be reversed if desired such that the deepest groove is disposed at an interior position. While the variable depth arrangement is illustrated as incorporating grooves 362, 362', 362" of substantially straight sided peaked cross-sectional profile, it is to be understood that variable depth arrangements may likewise incorporate grooves of other cross-sectional geometries including those illustrated and previously described in relation to FIGS. 11A–C. In addition, it is contemplated that in either a fixed depth or variable depth arrangement combinations of two or more different geometric groove profiles may be utilized if desired.

The operation of an air bag cover according to the present invention is illustrated in FIGS. 13A and 13B in reference to the embodiment illustrated in FIG. 5. As will be appreciated, the operation is substantially the same for other embodiments. As shown, during an early stage of deployment of the air bag cushion 336 the flap portion 350 of the cover 330 is bent in a generally concave orientation relative to the air bag cushion 336 as the releasable edge 354 breaks away from an inboard attachment position and the flap portion 350 rotates around the attached side 352 upwardly and towards the perimeter of the cover 330. As more complete egress of the air bag cushion 336 is achieved, the flap portion 350 is bent in a generally convex orientation relative to the air bag cushion 336 as it pivots about its attached side 352 in the manner shown in FIG. 13B. This dynamic bending of the flap portion 350 as deployment progresses is facilitated by the stiffness reducing members 360 within the flap portion thereby reducing stress within the system.

It is to be understood that virtually any combination of the previously described features may be utilized as desired across either the top or underside of an air bag cover thereby providing a high degree of control over opening characteristics. By way of example only, in FIG. 14 there is illustrated a variable depth arrangement corresponding generally to the arrangement illustrated in FIG. 12 but with the grooves 462, 462' 462" disposed across the upper surface of a cover 430 and with no decorative outer layer. It is also to be understood that while the present invention has been illustrated and described in relation to potentially preferred embodiments, constructions, and practices, that such embodiments, constructions, and practices are intended to be illustrative only and that the present invention is in no event to be limited thereto. Rather, it is contemplated that modifications and variations embodying the principles of the present invention will no doubt occur to those of skill in the art and it is therefore contemplated and intended that the present invention shall extend to all such modifications and variations as may incorporate the broad principles of the present invention within the full spirit and scope of the appended claims and all equivalents thereto. contemplated and intended that the present invention shall extend to all such modifications and variations as may incorporate the broad principles of the present invention within the full spirit and scope of the appended claims and all equivalents thereto.

What is claimed is:

1. A frangible cover of variable stiffness for use in overlying relation to an inflatable air bag cushion, the cover including a tear seam extending in a predefined pattern across the interior of the cover such that upon inflation of the inflatable air bag cushion the cover opens along the tear seam and at least a portion of the cover is folded back towards a perimeter of the cover to form an opening across the interior of the cover for egress of the air bag cushion through the cover, the cover comprising:

a displaceable flap portion of flexible character having a fixed side adjacent the perimeter of the cover and a releasable edge disposed in generally opposing relation to the fixed side along a portion of the tear seam, the flap portion being displaceable in a substantially hinging manner in a direction generally away from the tear seam and towards the perimeter upon egress of the air bag cushion through the cover;

the displaceable flap portion comprising at least one localized zone of reduced stiffness disposed between the fixed side and the releasable edge, wherein said at least one localized zone of reduced stiffness is of a substantially elongated geometry having a length dimension greater than a width dimension and wherein the length dimension extends substantially transverse to the direction of hinging movement by the flap portion and wherein said at least one localized zone of reduced stiffness defines an integral hinge within the displaceable flap portion such that the displaceable flap portion is substantially deformable in bending relation along said at least one localized zone of reduced stiffness between the fixed side and the releasable edge as the inflatable air bag cushion is inflated.

2. The invention as recited in claim 1, wherein said at least one localized zone of reduced stiffness comprises a thickness reducing depression extending partially into the cover.

3. The invention as recited in claim 2, wherein said thickness reducing depression has a cross-sectional geometry selected from the group consisting of: a substantially straight sided groove extending to a pointed apex; a substantially straight sided groove extending to a rounded apex; a substantially semi-circular groove and an inverted "U" shaped groove.

4. The invention as recited in claim 2, wherein said thickness reducing depression extends across an underside surface of the cover.

5. The invention as recited in claim 4, wherein said thickness reducing depression is of a generally elongate cigar shaped geometry including a relatively wide central portion extending towards tapered ends.

6. The invention as recited in claim 4, wherein said thickness reducing depression has a substantially elongate rectangular geometry.

7. A frangible cover of variable stiffness for use in overlying relation to an inflatable air bag cushion, the cover including a tear seam extending in a predefined pattern across the interior of the cover such that upon inflation of the inflatable air bag cushion the cover opens along the tear seam and at least a portion of the cover is folded back towards a perimeter of the cover to form an opening across the interior of the cover for egress of the air bag cushion through the cover, the cover comprising:

a displaceable flap portion of flexible character having a fixed side adjacent the perimeter of the cover and a releasable edge disposed in generally opposing relation to the fixed side along a portion of the tear seam, the flap portion being displaceable in a substantially hinging manner in a direction generally away from the tear seam and towards the perimeter upon egress of the air bag cushion through the cover; and a plurality of localized zones of reduced stiffness of substantially elongate geometry having a length dimension greater than a width dimension wherein said localized zones of reduced stiffness are disposed across at least a portion of the displaceable flap portion between the fixed side and the releasable edge in an orientation such that the length dimension is substantially transverse to the direction of hinging movement by the flap portion and wherein said localized zones of reduced stiffness define an arrangement of integral hinges within the displaceable flap portion such that the displaceable flap portion is substantially deformable in bending relation along said localized zones of reduced stiffness between the fixed side and the releasable edge as the inflatable air bag cushion is inflated.

8. The invention as recited in claim 7 wherein the cover is disposed at the interior of a steering wheel.

9. The invention as recited in claim 7, wherein at least a portion of said plurality of localized zones of reduced stiffness comprise thickness reducing depressions extending partially into the cover.

10. The invention as recited in claim 9, wherein said thickness reducing depressions extend across one of a top surface and an underside surface of the cover.

11. The invention as recited in claim 10, wherein said thickness reducing depressions are of a generally elongate cigar shaped geometry including a relatively wide central portion extending towards tapered ends.

12. The invention as recited in claim 10, wherein said thickness reducing depressions have a substantially rectangular geometry.

13. The invention as recited in claim 7, wherein said localized zones of reduced stiffness are disposed substantially parallel to one another in a concentrated arrangement adjacent the fixed side of the flap portion.

14. The invention as recited in claim 7, wherein said localized zones of reduced stiffness are disposed substantially parallel to one another in a substantially evenly spaced arrangement between the fixed side and the releasable edge of the flap portion.

15. The invention as recited in claim 7, wherein said localized zones of reduced stiffness are disposed substantially parallel to one another in spaced arrangement between the fixed side and the releasable edge of the flap portion and wherein the length dimension of said stiffness reducing members varies across the flap portion.

16. The invention as recited in claim 15, wherein the length dimension of said localized zones of reduced stiffness increases with distance away from the releasable edge.

17. The invention as recited in claim 15, wherein the length dimension of said localized zones of reduced stiffness decreases with distance away from the releasable edge.

18. The invention as recited in claim 7, wherein said localized zones of reduced stiffness are disposed substantially parallel to one another in spaced arrangement between the fixed side and the releasable edge of the flap portion and wherein the width dimension of said localized zones of reduced stiffness varies across the flap portion.

19. The invention as recited in claim 18, wherein the width dimension of said localized zones of reduced stiffness increases with distance away from the releasable edge.

20. The invention as recited in claim 18, wherein the width dimension of said localized zones of reduced stiffness decreases with distance away from the releasable edge.

21. A frangible cover of variable flexibility for use in overlying relation to an inflatable air bag cushion, the cover including a tear seam extending in a predefined pattern across the interior of the cover such that upon inflation of the inflatable air bag cushion the cover opens along the tear seam and at least a portion of the cover is folded back towards a perimeter of the cover to form an opening across the interior for egress of the air bag cushion through the cover, the cover comprising:

a displaceable flap portion of flexible character having a fixed side adjacent the perimeter of the cover and a releasable edge disposed in generally opposing relation to the fixed side along a portion of the tear seam, the flap portion being displaceable in a substantially hinging manner in a direction generally away from the tear seam and towards the perimeter upon egress of the air bag cushion through the cover; and a plurality of stiffness reducing depressions of substantially elongate geometry having a length dimension, a width dimension and a depth dimension wherein the length dimension is greater than the depth dimension and wherein said stiffness reducing depressions are disposed across at least a portion of the underside of the displaceable flap portion in a substantially parallel arrangement between the fixed side and the releasable edge in an orientation such that the length dimension of said stiffness reducing depressions is substantially transverse to the direction of hinging movement by the flap portion and such that the stiffness reducing depressions project generally away from the air bag cushion substantially in the direction of inflation of the air bag cushion and wherein said stiffness reducing depressions define an arrangement of integral hinges within the displaceable flap portion such that the displaceable flap portion is substantially deformable in bending relation along said stiffness reducing depressions between the fixed side and the releasable edge as the inflatable air bag cushion is inflated.

22. The invention as recited in claim 21, wherein said thickness reducing depressions have a generally elongate cigar shaped geometry including a relatively wide central portion extending towards tapered ends.

23. The invention as recited in claim 21, wherein said thickness reducing depressions have a substantially rectangular geometry.

24. The invention as recited in claim 21, wherein the length dimension of said thickness reducing depressions varies across the flap portion.

25. The invention as recited in claim 24, wherein the length dimension of said thickness reducing depressions increases with distance away from the releasable edge.

26. The invention as recited in claim 24, wherein the length dimension of said thickness reducing depressions decreases with distance away from the releasable edge.

27. The invention as recited in claim 21, wherein the width dimension of said thickness reducing depressions varies across the flap portion.

28. The invention as recited in claim 27, wherein the width dimension of said thickness reducing depressions increases with distance away from the releasable edge.

29. The invention as recited in claim 27, wherein the width dimension of said thickness reducing depressions decreases with distance away from the releasable edge.

30. The invention as recited in claim 21, wherein the depth dimension of said thickness reducing depressions varies across the flap portion.

31. The invention as recited in claim 30, wherein the depth dimension of said thickness reducing depressions increases with distance away from the releasable edge.

32. The invention as recited in claim 30, wherein the depth dimension of said thickness reducing depressions decreases with distance away from the releasable edge.

33. The invention as recited in claim 21, wherein the length dimension and at least one of the width dimension and the depth dimension vary across the flap portion.

34. The invention as recited in claim 21, wherein the width dimension and at least one of the length dimension and the depth dimension vary across the flap portion.

35. At The invention as recited in claim 21, wherein the length dimension and at least one of the width dimension and the depth dimension vary across the flap portion.

36. The invention as recited in claim 21, wherein the depth dimension and at least one of the width dimension and the length dimension vary across the flap portion.

37. The invention as recited in claim 21, wherein at least a portion of the thickness reducing depressions have a cross-sectional geometry selected from the group consisting of: substantially straight sided grooves extending to a pointed apex; straight sided grooves extending to a rounded apex; substantially semi-circular grooves and inverted "U" shaped grooves.

* * * * *